United States Patent
Bergman

(10) Patent No.: US 10,502,092 B2
(45) Date of Patent: Dec. 10, 2019

(54) INTERNALLY COOLED TURBINE PLATFORM

(71) Applicant: United Technologies Corporation, Hartford, CT (US)

(72) Inventor: Russell J. Bergman, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 778 days.

(21) Appl. No.: 14/945,556

(22) Filed: Nov. 19, 2015

(65) Prior Publication Data

US 2016/0146044 A1    May 26, 2016

Related U.S. Application Data

(60) Provisional application No. 62/082,233, filed on Nov. 20, 2014.

(51) Int. Cl.
| | |
|---|---|
| *F01D 25/12* | (2006.01) |
| *F01D 9/04* | (2006.01) |
| *F01D 11/08* | (2006.01) |
| *F01D 25/24* | (2006.01) |
| *F02C 3/04* | (2006.01) |

(52) U.S. Cl.
CPC ............. *F01D 25/12* (2013.01); *F01D 9/04* (2013.01); *F01D 9/041* (2013.01); *F01D 11/08* (2013.01); *F01D 25/246* (2013.01); *F02C 3/04* (2013.01); *F05D 2220/32* (2013.01); *F05D 2240/12* (2013.01); *F05D 2240/24* (2013.01); *F05D 2240/35* (2013.01); *F05D 2240/55* (2013.01); *F05D 2260/201* (2013.01); *Y02T 50/675* (2013.01)

(58) Field of Classification Search
CPC ........ F01D 11/025; F01D 11/14; F01D 11/20; F01D 11/24; F01D 25/12
See application file for complete search history.

(56) References Cited

U.S. PATENT DOCUMENTS

| | | | |
|---|---|---|---|
| 4,526,226 A | * | 7/1985 | Hsia .................. F01D 5/187 |
| | | | 165/109.1 |
| 5,092,735 A | | 3/1992 | Katy et al. |
| | | | (Continued) |

FOREIGN PATENT DOCUMENTS

| | | |
|---|---|---|
| EP | 0709550 | 5/1995 |
| EP | 1176285 | 1/2002 |
| | (Continued) | |

OTHER PUBLICATIONS

Extended European Search Report for Application No. 15195483.1 dated Apr. 1, 2016.

*Primary Examiner* — Gerald L Sung
(74) *Attorney, Agent, or Firm* — Carlson, Gaskey & Olds, P.C.

(57) ABSTRACT

A turbine flowpath component for a gas turbine engine includes a platform defining at least one internal cooling cavity and a turbine flowpath component cover disposed radially outward of the platform. The turbine flowpath component cover defines a radially outward edge of the at least one internal cooling cavity. The turbine flowpath component cover further defines a transition region in which a radial depth of the at least one internal cooling cavity varies from a first depth to a second depth.

16 Claims, 3 Drawing Sheets

(56) References Cited

U.S. PATENT DOCUMENTS

| | | | | |
|---|---|---|---|---|
| 5,486,090 A * | 1/1996 | Thompson | F01D 11/08 | 415/173.1 |
| 5,538,393 A * | 7/1996 | Thompson | F01D 11/08 | 415/115 |
| 5,562,408 A * | 10/1996 | Proctor | F01D 11/24 | 415/173.1 |
| 6,354,795 B1 * | 3/2002 | White | F01D 11/24 | 415/116 |
| 8,740,551 B2 | 6/2014 | Di Paola et al. | | |
| 8,814,507 B1 | 8/2014 | Campbell et al. | | |
| 2003/0131980 A1 | 7/2003 | Demarche et al. | | |
| 2005/0058534 A1 * | 3/2005 | Lee | F01D 5/288 | 415/116 |
| 2006/0083607 A1 * | 4/2006 | Synnott | F01D 11/08 | 415/173.1 |
| 2008/0101923 A1 * | 5/2008 | Botrel | F01D 11/24 | 415/173.1 |
| 2008/0131260 A1 | 6/2008 | Lee et al. | | |
| 2009/0035125 A1 * | 2/2009 | Fujimoto | F01D 11/24 | 415/116 |
| 2010/0074745 A1 * | 3/2010 | Jones | F01D 11/24 | 415/209.3 |
| 2010/0139288 A1 * | 6/2010 | Rago | F01D 11/24 | 60/785 |
| 2011/0188993 A1 * | 8/2011 | Bacha | F01D 11/24 | 415/115 |
| 2013/0051972 A1 | 2/2013 | Romanov | | |
| 2014/0000283 A1 * | 1/2014 | Spangler | F01D 25/12 | 60/806 |
| 2014/0271111 A1 * | 9/2014 | Ballard, Jr. | F01D 11/24 | 415/1 |
| 2015/0007581 A1 * | 1/2015 | Sezer | F01D 11/24 | 60/806 |
| 2015/0198063 A1 * | 7/2015 | Laletin | F01D 25/12 | 415/116 |
| 2016/0290157 A1 * | 10/2016 | Ning | F01D 11/08 | |

FOREIGN PATENT DOCUMENTS

| | | |
|---|---|---|
| EP | 1918526 | 5/2008 |
| FR | 2955891 | 8/2011 |

* cited by examiner

INTERNALLY COOLED TURBINE PLATFORM

CROSS-REFERENCE TO RELATED APPLICATION

This application claims priority to U.S. Provisional Application No. 62/082,233 filed Nov. 20, 2014.

TECHNICAL FIELD

The present disclosure relates generally to turbine structures, and more specifically to an internally cooled platform for use in a turbine section.

BACKGROUND

Gas turbine engines, such as those utilized on aircraft, utilize a compressor section to compress air. The compressed air is provided to a combustor, where the compressed is mixed with a fuel and ignited. The resultant gasses are expelled and expanded over a turbine section. The expansion of the resultant gasses drives the rotors within the turbine section to rotate. The rotational energy is provided to the compressor section via a shaft connection. In some examples, such as a geared turbofan engine, the rotational energy is also provided to a fan section forward of the compressor through a geared connection.

A typical turbine section includes multiple turbine stages with each stage being a pairing of turbine rotors and turbine stators. The turbine rotors are driven to rotate as the combustion gasses pass through the turbine section. In order to prevent combustion gasses from passing radially outward of the turbine blades, blade outer air seals (BOAS) are disposed in close radial proximity to the turbine blades. Similarly, in order to ensure that fluid flow through the turbine has desirable flow characteristics, turbine vane structures are mounted within the flowpath.

Turbine vanes, blade outer air seals, and other turbine flowpath components are mounted to the engine static structure using multiple platforms. Due to the exposure to the combustion gasses, the turbine flowpath components, and the corresponding platforms, are exposed to extreme temperatures. In order to reduce or minimize the impact of those extreme temperatures, the platforms supporting turbine flowpath components in some examples are actively cooled.

SUMMARY OF THE INVENTION

In one exemplary embodiment, a turbine flowpath component for a gas turbine engine includes a platform defining at least one internal cooling cavity and a turbine flowpath component cover disposed radially outward of the platform. The turbine flowpath component cover defines a radially outward edge of the at least one internal cooling cavity. The turbine flowpath component cover further defines a transition region in which a radial depth of the at least one internal cooling cavity varies from a first depth to a second depth.

In another exemplary embodiment of the above-described turbine flowpath component for a gas turbine engine, the first depth is a radial distance between the platform and the turbine flowpath component cover at an upstream edge of the platform. The second depth is a radial distance between the platform and the turbine flowpath component cover at a downstream edge of the platform.

In another exemplary embodiment of any of the above-described turbine flowpath component for a gas turbine engine, the at least one internal cooling cavity includes at least one serpentine cooling passage. The cover further includes at least one inlet for receiving cooling air into the at least one serpentine cooling passage.

In another exemplary embodiment of any of the above-described turbine flowpath components for a gas turbine engine, the at least one internal cooling cavity includes at least one impingement cavity.

In another exemplary embodiment of any of the above-described turbine flowpath components for a gas turbine engine, the turbine flowpath component cover includes a plurality of impingement holes disposed radially outward of the at least one impingement cavity. Each of the impingement holes allows cooling fluid to pass through the cover.

In another exemplary embodiment of any of the above-described turbine flowpath components for a gas turbine engine, the at least one internal cooling cavity includes at least one serpentine cooling passage and at least one impingement cavity.

In another exemplary embodiment of any of the above-described turbine flowpath components for a gas turbine engine, the turbine flowpath component cover further defines a first region having a first uniform radial depth on a first side of the transition region and a second region having a second uniform radial depth on a second side of the transition region. The transition region transitions from the first uniform depth to the second uniform depth.

In another exemplary embodiment of any of the above-described turbine flowpath components for a gas turbine engine, the first uniform radial depth is approximately 0.100 inches (0.254 centimeters) and wherein the second uniform radial depth is approximately 0.080 inches (0.203 centimeters).

In another exemplary embodiment of any of the above-described turbine flowpath components for a gas turbine engine, an angle of the transition region is at least partially aligned with a direction of fluid flow through a gas turbine engine including the turbine flowpath component.

In another exemplary embodiment of any of the above-described turbine flowpath components for a gas turbine engine, an angle of the transition region is at least partially aligned with a direction of fluid flow through a serpentine passage.

In another exemplary embodiment of any of the above-described turbine flowpath components for a gas turbine engine, the first region is an upstream edge of the platform relative to fluid flow through a gas turbine engine. The second region is a downstream edge of the platform relative to fluid flow through the gas turbine engine.

In another exemplary embodiment, any of the above-described turbine flowpath components for a gas turbine engine includes a plurality of the platforms arranged in a hoop configuration, each of the platforms including at least one connection feature operable to connect the corresponding platform to an engine static structure.

In another exemplary embodiment of any of the above-described turbine flowpath components for a gas turbine engine, the turbine flowpath component is a vane.

In one exemplary embodiment, a gas turbine engine includes, a primary flowpath defined within, and fluidly connecting, a compressor section, a combustor section, and a turbine section. The turbine section includes a plurality of stages. At least one of the stages includes at least one turbine flowpath component further including, a platform defining at least one internal cooling cavity and a turbine flowpath component cover disposed radially outward of the platform. The turbine flowpath component cover defines a radially outward edge of the at least one internal cooling cavity. The turbine flowpath component cover further defines a transition region in which a radial depth of the at least one internal cooling cavity varies from a first depth to a second depth.

In another exemplary embodiment of the above-described gas turbine engine, the at least one internal cooling cavity includes at least one serpentine cooling passage and at least one impingement cavity.

In another exemplary embodiment of any of the above-described gas turbine engines, the turbine flowpath component cover includes a plurality of impingement holes disposed radially outward of the at least one impingement cavity. Each of the impingement holes allows cooling fluid to pass through the cover.

In another exemplary embodiment of any of the above-described gas turbine engines, the turbine flowpath component cover further defines a first region having a first uniform radial depth on a first side of the transition region and a second region having a second uniform radial depth on a second side of the transition region. The transition region transitions from the first uniform depth to the second uniform depth.

In another exemplary embodiment of any of the above-described gas turbine engines, the first uniform radial depth is approximately 0.100 inches (0.254 centimeters) and wherein the second uniform radial depth is approximately 0.080 inches (0.203 centimeters).

An exemplary method for cooling a turbine flowpath component platform for a gas turbine engines includes, passing a cooling fluid through an internal cooling cavity of the turbine flowpath component platform. The internal cooling cavity includes a transition region transitioning from a first radial height to a second radial height. Flowing through the internal cooling cavity at the second radial height has an increased velocity relative fluid flowing through the internal cooling cavity at the first radial height.

A further example of the above exemplary method includes locally accelerating a fluid flow rate through the internal cooling cavity at a region of the turbine flowpath component platform needing increased cooling. The local acceleration is achieved by restricting fluid flow through the internal cooling cavity.

These and other features of the present invention can be best understood from the following specification and drawings, the following of which is a brief description.

DETAILED DESCRIPTION OF AN EMBODIMENT

Figure 1:
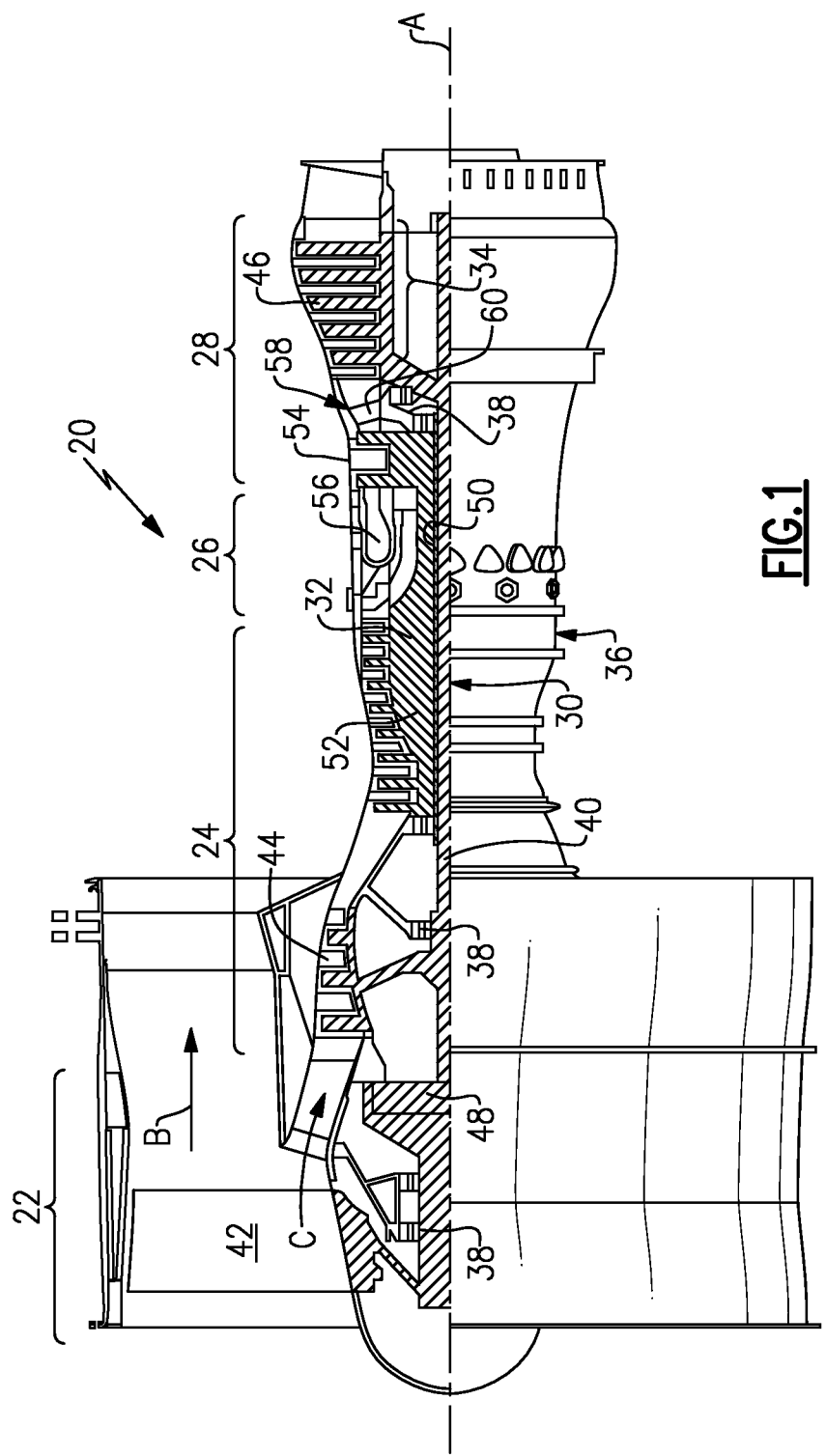
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflowpath C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R.)/(518.7°\ R.)]^{0.5}$. The "Low corrected fan tip speed" as disclosed herein according to one non-limiting embodiment is less than about 1150 ft/second.

Within the turbine section 28 are multiple stages. Each stage includes turbine rotors and turbine stators. Included fore of the turbine stages in some example turbine sections 28 are static turbine vanes. Radially outward of each of the turbine rotor stages are multiple blade outer air seals. The blade outer air seals for a given stage are platforms that are connected together to form a hoop-shaped body. The hoop shaped body is suspended in close proximity to the outer radial tips of the rotor blades and is connected to an engine static structure. In example turbine engines including stator vanes, the stator vanes are similarly mounted to the engine static structure using a corresponding platform with the vane protruding radially inward from the platform.

Figure 2A:
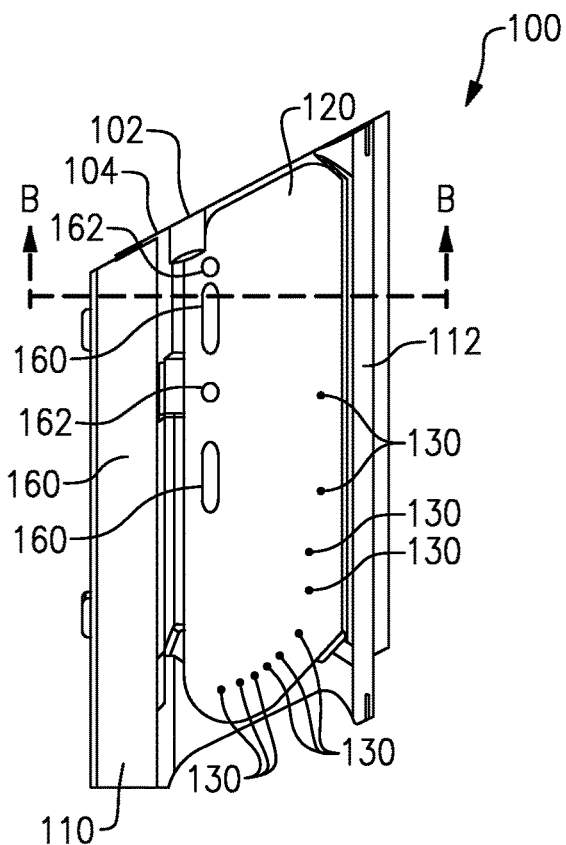
FIG. 2A schematically illustrates a blade outer air seal platform for utilization in a turbine section of a gas turbine engine.

FIG. 2A illustrates a platform 102 for a turbine flowpath component 100, such as a vane or a blade outer air seal. In one specific example, the platform 102 mounts a vane within a flowpath of a gas turbine engine. The illustrated view is drawn from a viewpoint exterior to an engine and looking radially inward. The turbine flowpath component 100 includes multiple connection features 110, 112 for connecting the platform 102 to an engine static structure. Positioned on a radially outward facing surface of the platform 102 is a turbine flowpath component cover 120. In some examples, the turbine flowpath component cover 120 is a sheet metal component cut or stamped to a desired shape. In other examples, the turbine flowpath component cover 120 can be constructed of other materials, or via other techniques and serve the same function.

The illustrated turbine flowpath component cover 120 of FIG. 2A includes multiple impingement holes 130. The impingement holes 130 allow cooling air to pass through the turbine flowpath component cover 120 as impingement jets and impinge on the platform 102 radially inward of the turbine flowpath component cover 120. The impingement jets formed by this arrangement cool the platform 102. Also included in the turbine flowpath component cover 120 are multiple serpentine cooling passage inlets 160 and outlets 162. In the illustrated example, the outlets 162 are film cooling holes. Cooling air is inlet into each of multiple serpentine passages (illustrated in FIG. 3) contained in platform 102 through the inlets 160.

Figure 2B:
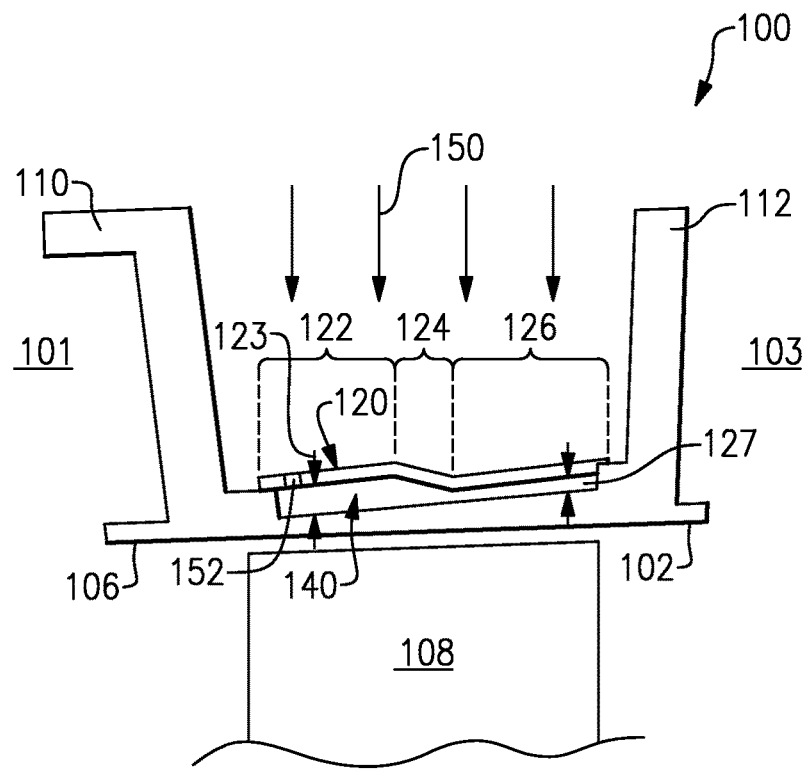
FIG. 2B schematically illustrates a cross sectional view of the blade outer air seal platform of FIG. 2A along view line B-B.

With continued reference to FIG. 2A, FIG. 2B illustrates a cross sectional view of the turbine flowpath component 100 along view line B-B. The illustrated connection features 110, 112 are generic connection features 110, 112. The specific geometry of each connection feature 110, 112, including any fastener holes, notches, or other intrusions or protrusions depends on the specific engine into which the turbine flowpath component 100 is being connected. The platform 102 defines a radially inward edge of the turbine flowpath component 100 structure, and includes a flowpath surface 106. If the turbine flowpath component 100 is a blade outer airseal, the flowpath surface 106 faces a turbine blade 108. If the turbine flowpath component 100 is a vane, flowpath surface 106 attaches to an airfoil (not shown). The turbine flowpath component cover 120 is positioned radially outward of an internal cooling cavity 140. The internal cooling cavity 140 includes multiple walls (illustrated in FIG. 3) protruding radially outward from the platform 102, and contacting the turbine flowpath component cover 120. The combination of the platform 102, the walls and the turbine flowpath component cover 120 defines multiple internal cooling passages within the internal cooling cavity 140. In some examples, the walls are integral to the platform 102. In other examples, the walls are a distinct structure or an integral part of the turbine flowpath component cover 120.

The turbine flowpath component cover 120, defines a radially outward boundary of the internal cooling cavity 140, and a radially outward boundary of the internal passages within the internal cooling cavity 140. In some examples, at least one of the internal cooling passages defined by the internal cooling cavity 140, the turbine flowpath component cover 120, and the radially outward protruding walls provide an impingement cooling flow into an impingement cavity. In the impingement cooling, cooling air 150 is directed radially inward onto the turbine flowpath component cover 120. The cooling air 150 passes through the impingement holes 130 and impinges on the platform 102, providing cooling according to known impingement cooling principles. In alternative impingement examples the cooling air 150 can be provided from another source and passed over the turbine flowpath component cover 120.

Some passages defined within the internal cooling cavity 140 are serpentine cooling passages, and the cooling air 150 enters the passages through at least one cooling air inlet 160. The cooling air 150 passes through the serpentine passages and is outlet through a serpentine cooling passage outlet 162. As the cooling air passes through the passage the cooling air cools the platform 102 using convective cooling. As with the impingement example, the cooling air 150 can be provided to the serpentine passages from another source or the inlets 160 and outlets 162 can be positioned in alternating locations in alternate examples.

Fluids passing through a passage increase in velocity as the passage is restricted in size. Furthermore, as a cooling fluid increases in velocity, the thermal transfer rates, and ability of the fluid to cool the passage may increase. As such, locally increasing the velocity of a cooling flow at an area requiring increased cooling improves the cooling effectiveness. In the illustrated example, a downstream edge 103 of the platform 102 requires increased cooling relative to an upstream edge 101. Further, locally decreasing the velocity of cooling flow at an area requiring decreased cooling transfers less heat to the cooling flow, leaving more capacity to cool subsequent areas of the cooling passage. This more efficiently uses the cooling fluid than previously known arrangements.

In order to increase the velocity of fluid flowing through the internal cooling cavity 140 in areas where increased cooling is desired, the turbine flowpath component cover 120 includes three portions, 122, 124, 126. An upstream portion 122 defines a first radial height 123 between the platform 102 and the turbine flowpath component cover 120. A downstream portion 126 defines a second radial height 127. While described herein as an "upstream portion" 122 and a "downstream portion" 126, one of skill in the art, having the benefit of this disclosure will recognize that the upstream portion 122 is upstream relative to gaspath flow, and the label upstream does not reflect the position of the upstream portion 122 relative to coolant flow. Similarly, one of skill in the art having the benefit of this disclosure will recognize that the downstream portion is downstream relative to gaspath flow, and the label downstream does not reflect the position of the downstream portion relative to coolant flow. Defined between the upstream portion 122 and the downstream portion 126 is a transitional portion 124. The radial height defined between the turbine flowpath component cover 120 and the platform 102 in the transitional portion transitions from the first radial height 123 to the second radial height 127. As the radial height of the passage decreases, the cross-sectional area of the passage is restricted, thereby driving a localized velocity increases in the cooling fluid passing through the passage.

In order to generate the increased cooling flow velocity described above, the second radial height 127 is less than the first radial height 123. In one example where the platform 102 is utilized to support a turbine vane structure, the first radial height 123 is 0.100 inches (0.254 centimeters) and the second radial height 127 is 0.080 inches (0.203 centimeters). In another example where the platform is used to support a turbine vane structure, the lengths of the first radial height can be within the range of 0.085-0.115 inches (0.216-0.292 centimeters) and the length of the second radial height can be within the range of 0.065-0.095 inches (0.165-0.241 centimeters). In the second example, the difference between the first radial height 123 and the second radial height 127 is at least 0.010 inches (0.025 centimeters). The magnitude of the localized flow velocity increase is dependent upon the change in radial height, with a greater change resulting in a greater localized increase.

The upstream portion 122 is closer to an upstream edge 101 of the turbine flowpath component 100 and the downstream portion 126 is closer to a downstream edge 103 of the turbine flowpath component 100. In the illustrated example, the angle of the transition portion 124 is aligned with, and transitions along, a direction of flow through a core flowpath of the gas turbine engine. In alternative examples, the angle of the transition portion 124 can be aligned with fluid flow through the passages defined in the internal cooling cavity 140.

In the examples described above, fluid flow velocity through the passages within the internal cooling cavity 140 is increased in the more restricted portions of the passages (the downstream portion) relative to the fluid flow velocity through the less restricted portions of the passages (the upstream portions). Such a configuration provides increased cooling to the downstream portions where the illustrated platform is more vulnerable to extreme temperatures. In alternative platforms, where the upstream portion 122 is more susceptible to extreme temperatures, the relative radial heights 123, 127 of the turbine flowpath component cover 120 can be reversed, with the upstream portion 122 being more restricted (having a lesser radial height) than the downstream portion 124.

Figure 3:
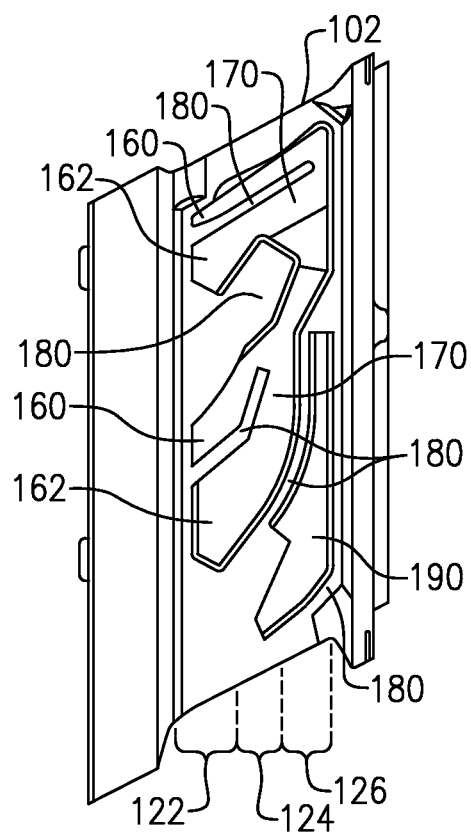
FIG. 3 schematically illustrates the blade outer air seal platform of FIG. 2A, without the inclusion of a cover.

With continued reference to FIGS. 2A and 2B, and with like numerals indicating like elements, FIG. 3 illustrates the view of FIG. 2A with the removal of the turbine flowpath component cover 120. Multiple passage defining features 180, such as walls, protrude radially outward from the platform 102. The features 180 contact the turbine flowpath component cover 120 when the turbine flowpath component cover 120 is installed. The illustrated passage defining features 180 define multiple serpentine passages 170, with two inlets 160 and two outlets 162. In the illustration of FIG. 2A, each of the inlets 160 is a hole, or other opening, in the turbine flowpath component cover 120 that allows the cooling air 150 to enter the internal cooling cavity. Similarly, each of the outlets 162 is illustrated as a smaller hole or opening that allows fluid to exits the cavity. As the size of the outlet 162 is restricted relative to the inlet, fluid flow through the passage increases in pressure further increasing the cooling potential. One of skill in the art, will understand that the particular orientation, design, number of inlets or outlets etc. of the serpentine passages can be modified while still falling within the bounds of the present disclosure. An impingement cavity 190 is also defined by the passage defining features 180. The impingement cavity 190 functions in the manner described above with regards to FIGS. 2A and 2B.

Figure 4:
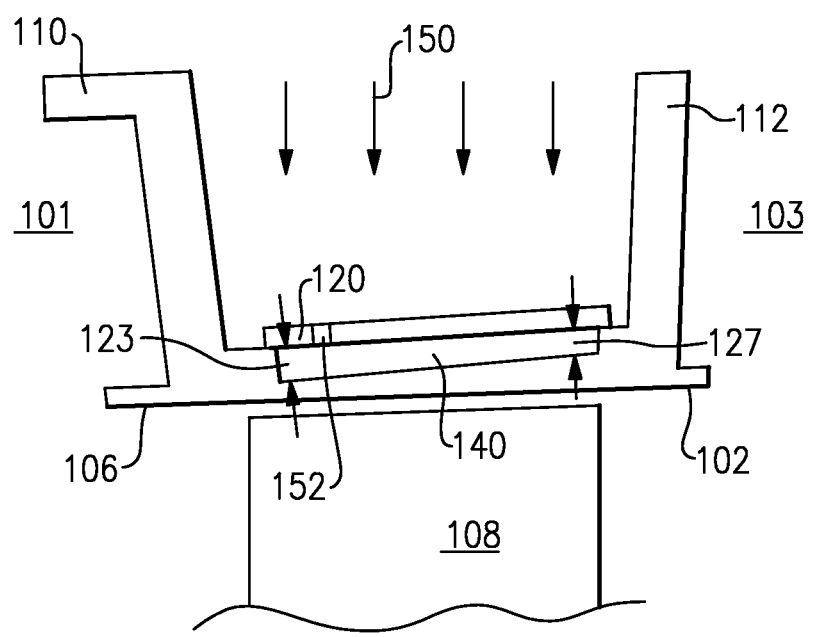
FIG. 4 schematically illustrates an alternate example cross section of a blade outer air seal platform for utilization in a turbine section of a gas turbine engine.

FIG. 4 illustrates the cross section of FIG. 2B in an alternative arrangement. Rather than including the three discrete portions 122, 124, 126 of the turbine flowpath component cover 120, the alternative of FIG. 4 utilizes a single transition region that extends from the upstream side 101 of the blade outer air seal to the downstream side 103 of the blade outer air seal. The restriction of the radial height of the internal cavity 140 operates similarly to the discrete portions 122, 124, 126 described above with regards to FIG. 2B, with the exception that the transition region extends the full length of the internal cavity. The singular transition region can be achieved by utilizing a varied depth of the platform base in conjunction with a straight turbine flowpath component cover 120, or by angling the turbine flowpath component cover 120 relative to the platform 102.

While described above with general regards to a turbine flowpath component, one of skill in the art, having the benefit of this disclosure, will understand that the principles described herein can be applied to a platform supporting a turbine vane structure, a blade outer air seal structure, or any similar turbine flowpath component. Further, the illustrated platform can be modified to support other turbine structures while still including the described cooling system and passaged.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine flowpath component for a gas turbine engine comprising:
    a platform defining at least one internal cooling cavity;
    a turbine flowpath component cover disposed radially outward of said platform, wherein the turbine flowpath component cover defines a radially outward edge of said at least one internal cooling cavity;

wherein the turbine flowpath component cover defines a transition region in which a radial depth of the at least one internal cooling cavity varies from a first depth to a second depth, and a first region having a first radial depth on a first side of the transition region and a second region having a second radial depth on a second side of the transition region, and wherein the transition region transitions from the first depth to the second depth, said first region being an upstream edge of said at least one internal cooling cavity relative to a fluid flow through a gas turbine engine, and said second region is a downstream edge of said at least one internal cooling cavity relative to the fluid flow through the gas turbine engine; and wherein the first depth is a radial distance between the platform and the turbine flowpath component cover at an upstream edge of the at least one internal cooling cavity and wherein the second depth is a radial distance between the platform and the turbine flowpath component cover at a downstream edge of the at least one internal cooling cavity, and wherein the first radial depth is greater than the second radial depth; and wherein the turbine flowpath component cover maintains a constant angle relative to the platform through the transition region.

2. The turbine flowpath component of claim 1, where the at least one internal cooling cavity includes at least one serpentine cooling passage, and wherein the turbine flowpath component cover further includes at least one inlet for receiving cooling air into said at least one serpentine cooling passage.

3. The turbine flowpath component of claim 1, wherein the at least one internal cooling cavity includes at least one impingement cavity.

4. The turbine flowpath component of claim 3, wherein said turbine flowpath component cover includes a plurality of impingement holes disposed radially outward of the at least one impingement cavity, and wherein each of said impingement holes allows cooling fluid to pass through said flowpath component cover.

5. The turbine flowpath component of claim 1, wherein the at least one internal cooling cavity includes at least one serpentine cooling passage and at least one impingement cavity.

6. The turbine flowpath component of claim 1, wherein the first radial depth is a first uniform radial depth, and the second radial depth is a second uniform radial depth.

7. The turbine flowpath component of claim 6, wherein the first uniform radial depth is approximately 0.100 inches (0.254 centimeters) and wherein the second uniform radial depth is approximately 0.080 inches (0.203 centimeters).

8. The turbine flowpath component of claim 6, wherein an angle of said transition region is at least partially aligned with a direction of fluid flow through the gas turbine engine including the turbine flowpath component.

9. The turbine flowpath component of claim 6, wherein an angle of said transition region is at least partially aligned with a direction of fluid flow through a serpentine passage.

10. The turbine flowpath component of claim 1, further comprising a plurality of said platforms arranged in a hoop configuration, each of said platforms including at least one connection feature operable to connect the corresponding platform to an engine static structure.

11. The turbine flowpath component of claim 1, wherein the turbine flowpath component is a vane.

12. A gas turbine engine comprising:
a primary flowpath defined within, and fluidly connecting, a compressor section, a combustor section, and a turbine section;
said turbine section including a plurality of stages;
at least one of said stages including at least one turbine flowpath component further comprising:
a platform defining at least one internal cooling cavity;
a turbine flowpath component cover disposed radially outward of said platform, wherein the turbine flowpath component cover defines a radially outward edge of said at least one internal cooling cavity; and
wherein the turbine flowpath component cover further defines a transition region in which a radial depth of the at least one internal cooling cavity varies from a first depth to a second depth, and a first region having a first radial depth on a first side of the transition region and a second region having a second radial depth on a second side of the transition region, and wherein the transition region transitions from the first radial depth to the second radial depth, said first region being an upstream edge of said at least one internal cooling cavity relative to a fluid flow through a gas turbine engine, and said second region is a downstream edge of said at least one internal cooling cavity relative to the fluid flow through the gas turbine engine; and
wherein the first radial depth is a radial distance between the platform and the turbine flowpath component cover at an upstream edge of the at least one internal cooling cavity and wherein the second radial depth is a radial distance between the platform and the turbine flowpath component cover at a downstream edge of the at least one internal cooling cavity, and wherein the first radial depth is greater than the second radial depth; and
wherein the turbine flowpath component cover maintains a constant angle relative to the platform through the transition region.

13. The gas turbine engine of claim 12, wherein the at least one internal cooling cavity includes at least one serpentine cooling passage and at least one impingement cavity.

14. The gas turbine engine of claim 13, wherein said turbine flowpath component cover includes a plurality of impingement holes disposed radially outward of the at least one impingement cavity, and wherein each of said impingement holes allows cooling fluid to pass through said turbine flowpath component cover.

15. The gas turbine engine of claim 12, wherein the first radial depth is a first uniform radial depth and the second radial depth is a second uniform radial depth.

16. The gas turbine engine of claim 15, wherein the first uniform radial depth is approximately 0.100 inches (0.254 centimeters) and wherein the second uniform radial depth is approximately 0.080 inches (0.203 centimeters).

* * * * *